(12) United States Patent
Chikagawa et al.

(10) Patent No.: US 9,278,604 B2
(45) Date of Patent: Mar. 8, 2016

(54) VEHICLE AIR CONDITIONING DEVICE

(75) Inventors: Noriyuki Chikagawa, Tokyo (JP);
Soichiro Fujita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 449 days.

(21) Appl. No.: 13/516,048

(22) PCT Filed: May 25, 2011

(86) PCT No.: PCT/JP2011/062030
§ 371 (c)(1),
(2), (4) Date: Jun. 14, 2012

(87) PCT Pub. No.: WO2011/152267
PCT Pub. Date: Dec. 8, 2011

(65) Prior Publication Data
US 2012/0247717 A1 Oct. 4, 2012

(30) Foreign Application Priority Data
May 31, 2010 (JP) ................. 2010-124741

(51) Int. Cl.
*F28F 9/08* (2006.01)
*F28F 9/12* (2006.01)
(Continued)

(52) U.S. Cl.
CPC .. *B60H 1/00528* (2013.01); *B60H 2001/00635* (2013.01)

(58) Field of Classification Search
CPC ........... B60H 1/00528; B60H 1/00542; B60H 1/00514; F24F 2013/20; F24F 2013/205; F28F 9/08; F28F 9/12; F28F 9/14

USPC ........ 165/42, 44, 76, 78; 29/890.03, 890.031, 29/890.035, 890.052
See application file for complete search history.

(56) References Cited

U.S. PATENT DOCUMENTS 4,146,258 A * 3/1979 Andruchiw ................ 292/256.6
4,664,551 A * 5/1987 Poitier .......................... 403/335
(Continued)

FOREIGN PATENT DOCUMENTS

CN 1962298 A 5/2007
DE G8910424.2 U1 7/1990
(Continued)

OTHER PUBLICATIONS

Office Action dated Mar. 4, 2014, issued in Chinese Patent Application No. 201180005121.X with English Translation (14 pages).
(Continued)

*Primary Examiner* — Allen Flanigan
*Assistant Examiner* — For K Ling
(74) *Attorney, Agent, or Firm* — Westerman, Hattori, Daniels & Adrian, LLP

(57) ABSTRACT

Provided is a vehicle air conditioning device including an air conditioning unit in which: a unit case (10) of the air conditioning unit is formed of a plurality of lower and upper divided cases (23, 24, 25); and the divided cases (23, 24, 25) are coupled integrally to each other through a mating portion (34) provided to division end surfaces (30A, 30B, 32). The vehicle air conditioning device also includes a space (35) having a given height in the top-bottom direction and a given width is formed between respective case inner division end surfaces (32, 30B) of the divided cases (24, 25) on one side and the divided case (23) on the other side, the divided cases (23, 24, 25) constituting the mating portion (34).

2 Claims, 3 Drawing Sheets

(51) Int. Cl.
*F28F 9/14* (2006.01)
*B60H 1/00* (2006.01)

(56) References Cited

U.S. PATENT DOCUMENTS

| | | | | |
|---|---|---|---|---|
| 5,529,353 | A * | 6/1996 | Kuo | 292/307 R |
| 5,873,779 | A * | 2/1999 | Raccouard | 454/158 |
| 6,092,385 | A * | 7/2000 | Yoshida | 62/272 |
| 6,385,984 | B2 * | 5/2002 | Aoki | 62/244 |
| 6,557,722 | B2 * | 5/2003 | Ueno et al. | 220/796 |
| 6,662,590 | B2 * | 12/2003 | Kamuf | 62/428 |
| 7,607,888 | B2 * | 10/2009 | Hori et al. | 415/214.1 |
| 2001/0017038 | A1 | 8/2001 | Aoki | |
| 2009/0296357 | A1 * | 12/2009 | Pitkonen | H04M 1/0202 361/752 |
| 2012/0097693 | A1 * | 4/2012 | Takeuchi | H02G 3/088 220/810 |
| 2013/0156499 | A1 * | 6/2013 | Grieb et al. | 403/375 |

FOREIGN PATENT DOCUMENTS

| | | | |
|---|---|---|---|
| DE | 102009057869 | A1 * | 6/2011 |
| GB | 1496489 | A * | 12/1977 |
| JP | 62-173208 | U | 11/1987 |
| JP | 6-135220 | A | 5/1994 |
| JP | 06135220 | A * | 5/1994 |
| JP | 09-042456 | A | 2/1997 |
| JP | 10-100642 | A | 4/1998 |
| JP | 10-119538 | A | 5/1998 |
| JP | 11-321295 | A | 11/1999 |
| JP | 3356101 | B2 | 12/2002 |
| JP | 2005-184921 | A | 7/2005 |
| JP | 2006-347481 | A | 12/2006 |
| JP | 2007-99230 | A | 4/2007 |
| JP | 4075681 | B2 | 4/2008 |

OTHER PUBLICATIONS

Office Action dated Nov. 21, 2013, issued in corresponding German application No. 112011101850.9, w/ English translation.
International Search Report for PCT/JP2011/062030 on mailing date Aug. 23, 2011.
Japanese Decision to Grant a Patent dated Sep. 2, 2014, issued in corresponding JP application No. 2010-124741 with English translation (7 pages).

* cited by examiner

VEHICLE AIR CONDITIONING DEVICE

TECHNICAL FIELD

The present invention relates to a vehicle air conditioning device including a unit case that is configured by integrally coupling a plurality of upper and lower divided cases.

BACKGROUND ART

In an air conditioning unit (heating ventilation and air conditioning unit; HVAC unit) of a vehicle air conditioning device, an evaporator, a heater core, an air mixing damper, a plurality of blow-off mode switching dampers, and the like are incorporated inside of a unit case in which an air flow channel is formed. In general, the unit case is configured by integrally coupling a plurality of divided resin cases, in consideration of restrictions on shaping and the incorporation of the above-mentioned machines.

These divided cases are coupled integrally to each other through a mating portion, and the mating portion is configured by fitting a convex portion provided on a division end surface of one divided case to a concave portion provided on a division end surface of another divided case. This configuration can prevent air leakage and water leakage from the coupled portion. Even if the divided cases are coupled to each other through the mating portion, however, water may invade due to a capillary action, and water leakage may occur. Under the circumstances, PTL 1 to PTL 4 disclose, for example, techniques of: interposing an elastic seal member; providing a stepped portion that blocks water from invading a division end surface; and providing a cover wall that covers at a given interval a division end portion in which a mating portion is formed.

CITATION LIST

Patent Literature

{PTL 1}
 The Publication of Japanese Patent No. 3356101
{PTL 2}
 The Publication of Japanese Patent No. 4075681
{PTL 3}
 Japanese Unexamined Patent Application, Publication No. 2005-184921
{PTL 4}
 Japanese Unexamined Patent Application, Publication No. 2006-347481

SUMMARY OF INVENTION

Technical Problem

Unfortunately, the technique of interposing an elastic seal member requires incorporating the elastic seal member configured as a separate component, and hence assembly man-hours and component costs unfavorably increase.

The technique of simply providing a stepped portion or a cover wall does not require an additional component, but water that has entered the unit case may be scattered into the stepped portion or the cover wall along an inner surface of the unit case, and the water may reach and be attached to a root area of the mating portion or to the division end surface. In this case, the water may be pushed out from the root area or the division end surface to an outer surface of the unit case, along with an increase in static pressure in the unit case due to a capillary action, and then the water may invade a chamber. Hence, further improvement is still desired.

The present invention, which has been made in view of the above-mentioned circumstances, has an object to provide a vehicle air conditioning device that can reliably prevent a trouble that water that has entered a unit case leaks from a coupled portion between divided cases into a chamber, to thereby enhance the reliability of water leakage prevention.

Solution to Problem

In order to solve the above-mentioned problems, a vehicle air conditioning device of the present invention adopts the following solutions.

The vehicle air conditioning device according to the present invention includes an air conditioning unit that includes an evaporator and a heater core and regulates temperature of air fed from a blower unit to blow off the air into a chamber, a unit case of the air conditioning unit being formed of at least a plurality of upper and lower divided cases, the divided cases being coupled integrally to each other through a mating portion provided to division end surfaces. The vehicle air conditioning device further includes: a space formed between case inner division end surfaces of one divided case and another divided case constituting the mating portion, the space having a given height in a top-bottom direction and a given width; and an extended wall surface for closing the space, the extended wall surface being extended from a position of the division end surface of the one divided case to a position in contact with an inner side surface of the another divided case.

According to the present invention, in the unit case, the plurality of upper and lower divided cases are coupled integrally to each other through the mating portion provided to the division end surfaces. The space is formed between the case inner division end surfaces of one divided case and another divided case constituting the mating portion, the space having the given height in the top-bottom direction and the given width. The extended wall surface for closing the space is extended from the position of the division end surface of the one divided case to the position in contact with the inner side surface of the another divided case. With this configuration, even if water that has entered the unit case from an external air inlet port through the blower unit is scattered inside of the unit case, flows along an inner surface of the unit case, and thus comes near to invading the mating portion from the division end surfaces of the divided cases along with an increase in static pressure in the case, the water is first blocked by the extended wall surface from invading the space formed between the case inner division end surfaces of the divided cases. Further, even if the water invades the space closed by the extended wall surface, the water is blocked by the presence of the space from reaching the mating portion. Accordingly, it is possible to reliably prevent a trouble that water that has entered the unit case flows beyond the mating portion of the divided cases due to a capillary action to leak to an outer surface of the unit case, that is, to the inside of the chamber, to thereby enhance the reliability of water leakage prevention. The water that has invaded the unit case is collected into a drain pan formed below an area in which the evaporator is set, and is discharged to the outside of the chamber through a drain hole.

According to a vehicle air conditioning device of a first aspect of the present invention, in the above-mentioned vehicle air conditioning device, the given height and the given width of the space are large enough to block water from invading the mating portion due to a capillary action even if a given amount of water is held in the space.

According to the vehicle air conditioning device of the first aspect of the present invention, the given height and the given width of the space are large enough to block water from invading the mating portion due to the capillary action even if the given amount of water is held in the space. With this configuration, even if water flows along the inner surface of the unit case and invades the space closed by the extended wall surface, it is possible to prevent a trouble that the water further invades the mating portion from the space due to the capillary action. Accordingly, it is possible to reliably prevent the water that has invaded the unit case from leaking into the chamber.

Further, according to a vehicle air conditioning device of a second aspect of the present invention, any of the above-mentioned vehicle air conditioning devices further includes a chamfered or rounded portion provided in any one or both of: a corner portion between the inner side surface of the another divided case and the case inner division end surface thereof, the extended wall surface being in contact with the inner side surface; and a corner portion of a leading end surface of the extended wall surface, the corner portion being in contact with the inner side surface of the another divided case.

According to the vehicle air conditioning device of the second aspect of the present invention, the chamfered or rounded portion is provided in any one or both of: the corner portion between the inner side surface of the another divided case and the case inner division end surface thereof, the extended wall surface being in contact with the inner side surface; and the corner portion of the leading end surface of the extended wall surface, the corner portion being in contact with the inner side surface of the another divided case. With this configuration, at the time of fitting and integral coupling through the mating portion provided on the division end surfaces of the plurality of upper and lower divided cases, the extended wall surface provided to the one divided case can be abutted against the inner side surface of the another divided case with the chamfered or rounded portion serving as a guide surface. Accordingly, because the leading end surface of the extended wall surface is prevented from abutting against the case inner division end surface of the another divided case, attachment properties between the divided cases are not impaired, and the upper and lower divided cases can smoothly integrally be assembled and coupled to each other.

Advantageous Effects of Invention

According to the present invention, even if water that has entered the unit case from the external air inlet port through the blower unit is scattered inside of the unit case, flows along the inner surface of the unit case, and thus comes near to invading the mating portion from the division end surfaces of the divided cases along with an increase in static pressure in the case, the water is first blocked by the extended wall surface from invading the space formed between the case inner division end surfaces of the divided cases. Further, even if the water invades the space closed by the extended wall surface, the water is blocked by the presence of the space from reaching the mating portion. Accordingly, it is possible to reliably prevent a trouble that water that has entered the unit case flows beyond the mating portion of the divided cases due to a capillary action to leak to the outer surface of the unit case, that is, to the inside of the chamber, to thereby enhance the reliability of water leakage prevention.

DESCRIPTION OF EMBODIMENTS

Hereinafter, an embodiment of the present invention is described with reference to FIG. 1 to FIG. 3.

Figure 1:
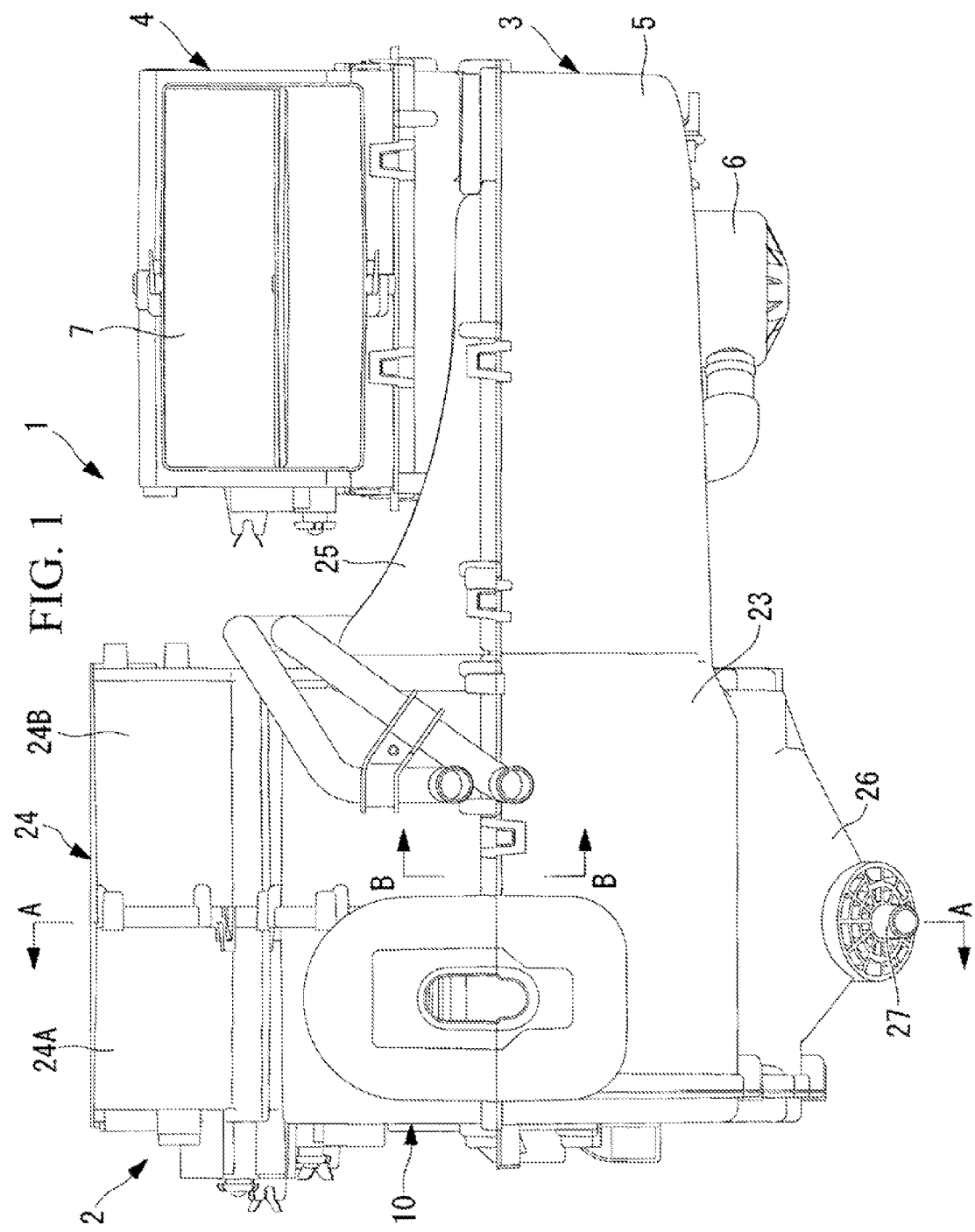
FIG. 1 is a side view of a vehicle air conditioning device according to an embodiment of the present invention, which is taken from a vehicle front side.
Figure 2:
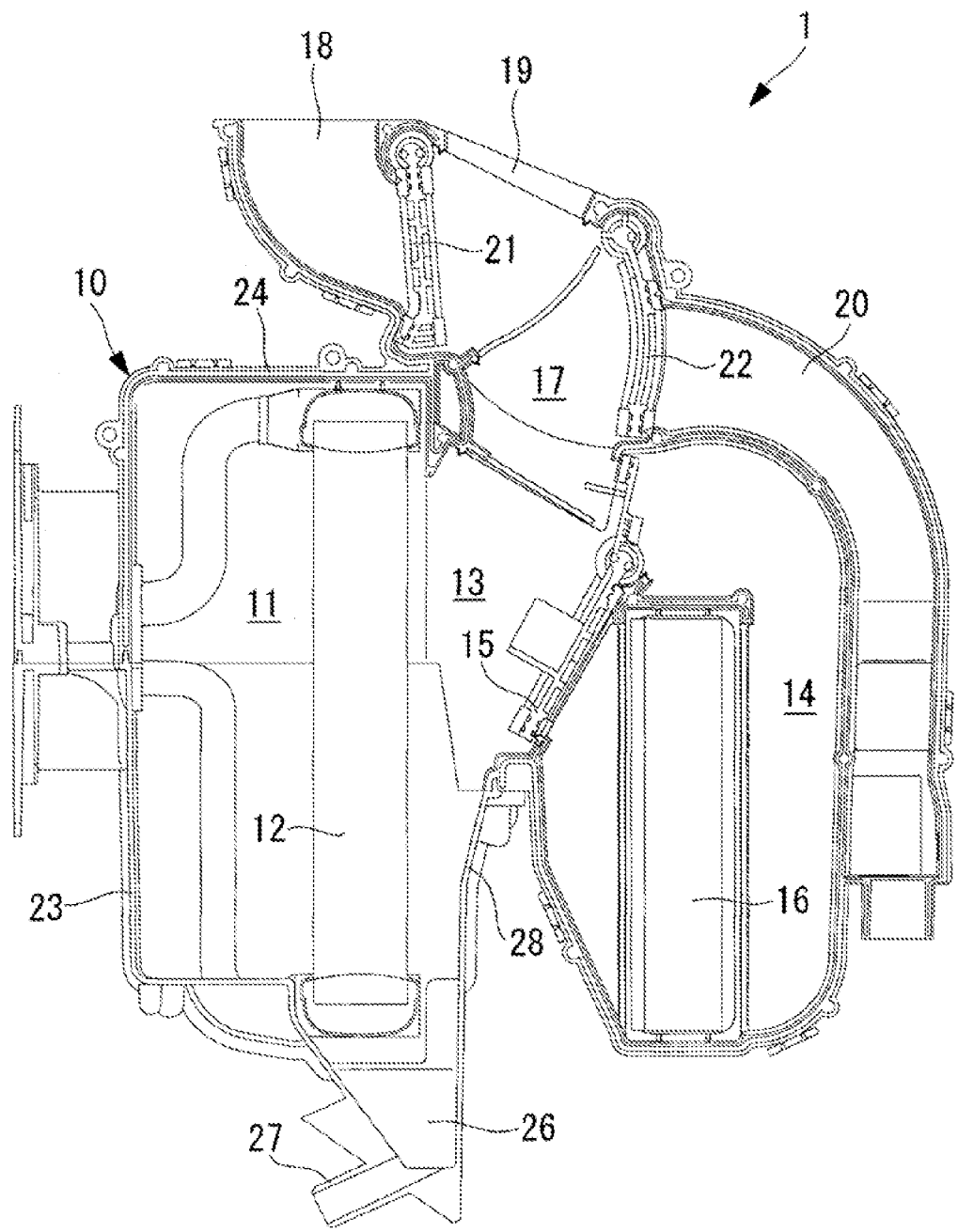
FIG. 2 is an A-A sectional view of the vehicle air conditioning device illustrated in FIG. 1.
Figure 3:
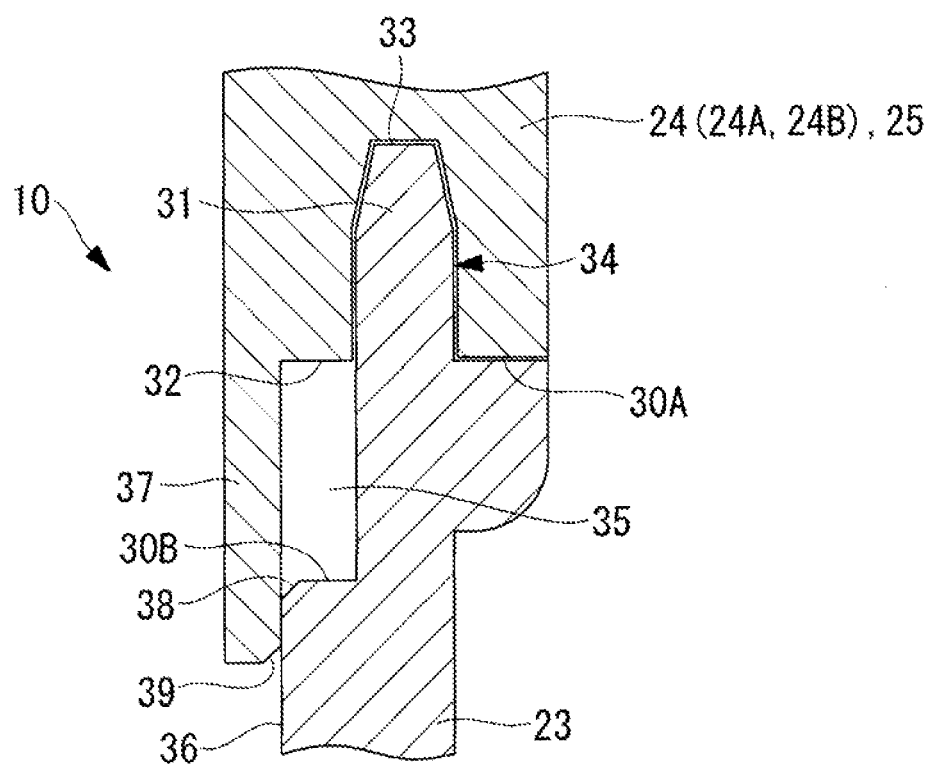
FIG. 3 is a B-B sectional view of the vehicle air conditioning device illustrated in FIG. 1.

FIG. 1 illustrates a side view of a vehicle air conditioning device according to the embodiment of the present invention, which is taken from a vehicle front side, FIG. 2 illustrates an A-A sectional view thereof, and FIG. 3 illustrates a B-B sectional view thereof.

A vehicle air conditioning device 1 includes an air conditioning unit (heating ventilation and air conditioning unit; HVAC unit) 2, a blower unit 3, and an intake box 4 that is coupled to the blower unit 3 and switchingly introduces external air or internal air.

The blower unit 3 is arranged on one side of the HVAC unit 2, and includes: a whorl-like fan casing 5 that is formed integrally with a lower divided case 23 to be described later; an impeller that is rotatably supported in the fan casing 5; and a motor 6 that rotationally drives the impeller. The intake box 4 is connected to an air suction port provided on an upper surface of the whorl-like fan casing 5 of the blower unit 3. The intake box 4 includes: an external air inlet port 7 for introducing external air; an internal air inlet port (not illustrated) for introducing air in a chamber; a switching damper that switchingly introduces the external air or the internal air from the two inlet ports; and an air filter.

The HVAC unit 2 includes a unit case 10 having a divided structure to be described later, and an air flow channel 11 is formed in the unit case 10. The air flow channel 11 changes the direction of an air flow fed from the blower unit 3 into the front-back direction, and circulates the air flow to the downstream side. An evaporator 12 is substantially vertically provided upstream of the air flow channel 11, and the evaporator 12 constitutes a refrigeration cycle (not illustrated). The air flow channel 11 is branched into a bypass flow channel 13 and a heating flow channel 14, downstream of the evaporator 12. An air mixing damper 15 is provided at the branched portion into the bypass flow channel 13 and the heating flow channel 14, and the air mixing damper 15 enables the adjustment of a flow ratio of air flows to be circulated into the bypass flow channel 13 and the heating flow channel 14. A heater core 16 is substantially vertically provided in the heating flow channel 14, and cooling water from an engine cooling water circuit (not illustrated) is circulated in the heater core 16.

The bypass flow channel 13 and the heating flow channel 14 join together in an air mixing region 17 downstream of the air mixing damper 15, and are communicated with a defroster blow-off channel 18, a face blow-off channel 19, and a foot blow-off channel 20 that are formed downstream of the air mixing region 17. A defroster/face damper 21 is provided between the defroster blow-off channel 18 and the face blow-off channel 19, and a foot damper 22 is provided at an entrance of the foot blow-off channel 20. The blow-off mode of conditioned air can be selectively switched by opening/closing the defroster/face damper 21 and the foot damper 22 for blow-off mode switching, among a face mode, a foot mode, a defroster mode, a defroster/foot mode, a bi-level mode, and the like.

The unit case 10 having the divided structure is divided into two lower and upper portions, that is, a lower divided case 23 and an upper divided case 24, and the upper divided case 24 is further divided into two, that is, left and right upper divided cases 24A and 24B. The lower divided case 23 is formed integrally with the whorl-like fan casing 5 or is coupled integrally to the fan casing 5. An upper portion of the lower divided case 23 is opened, and the upper divided case 24 can be coupled to the opened upper portion. An upper case 25 is attached to the upper portion of the lower divided case 23 on the fan casing 5 side.

The evaporator 12 is set in the lower divided case 23, and a drain pan 26 is formed on a bottom surface of an area in which the evaporator 12 is set. The drain pan 26 collects drain water that flows down from the evaporator 12, water that has entered the unit case 10 from the external air inlet port 7 of the intake box 4 through the blower unit 3, and the like. A drain hole 27 is provided in a lowermost area of the drain pan 26, and the drain hole 27 serves to discharge the collected drain water to the outside of the chamber. A guide wall 28 is provided in the lower divided case 23, and the guide wall 28 prevents the drain water from flying out to the downstream side, and guides an air flow that has passed through a region below the evaporator 12, toward the air mixing damper 15.

The lower divided case 23 constituting the unit case 10 having the divided structure is coupled, through a mating portion, integrally to the left and right upper divided cases 24A and 24B of the upper divided case 24 and the upper case 25, and the lower divided case 23 is fixed thereto by tightening with screws or the like, whereby air leakage and water leakage from the coupled portion can be prevented. The mating portion is configured by fitting, to each other, a convex portion and a concave portion provided on respective division end surfaces of the cases.

In particular, as illustrated in FIG. 3, lower and upper division surfaces between: the lower divided case 23; and the left and right upper divided cases 24A and 24B of the upper divided case 24 and the upper case 25 are not simply coupled through the mating portion, but the following coupling structure is adopted therefore.

A convex portion 31 for mating-portion coupling is provided to the lower divided case 23 so as to protrude upward from a case outer division end surface 30A. A concave portion 33 for mating-portion coupling is provided on a division end surface 32 of the left and right upper divided cases 24A and 24B of the upper divided case 24 and the upper case 25, and the convex portion 31 is fitted to the concave portion 33. The mating portion 34 is configured by fitting the convex portion 31 to the concave portion 33.

A case inner division end surface 30B of the lower divided case 23 is set to a position lower in the top-bottom direction by predetermined dimensions than that of the case outer division end surface 30A. Then, a space 35 having a given height in the top-bottom direction and a given width is formed between: the division end surface 32 of the left and right upper divided cases 24A and 24B and the upper case 25; and the case inner division end surface 30B. The space 35 is closed by an extended wall surface 37 that is extended from the division end surface 32 of the left and right upper divided cases 24A and 24B and the upper case 25 to a position in contact with a case inner side surface 36 of the lower divided case 23.

The space 35 closed by the extended wall surface 37 functions as a space having dimensions in the height and width directions that are large enough to block water from invading a root area of the mating portion 34 due to a capillary action even if a given amount of water is held in the space 35. The space 35 forms, a double-structure barrier for addressing a trouble that water that has entered the unit case 10 flows beyond the mating portion 34 due to a capillary action to leak to an outer surface of the unit case 10.

Chamfered or rounded portions 38 and 39 are respectively provided in a corner portion between the case inner division end surface 30B of the lower divided case 23 and the extended wall surface 37 and/or a corner portion of a leading end surface of the extended wall surface 37 of the left and right upper divided cases 24A and 24B and the upper case 25. The chamfered or rounded portions 38 and 39 serve to guide the extended wall surface 37 to the case inner side surface 36 of the lower divided case 23 when the lower divided case 23 is coupled integrally to the left and right upper divided cases 24A and 24B of the upper divided case 24 and the upper case 25. Only any one of the rounded portion 38 and the rounded portion 39 may be provided.

The above-mentioned configuration according to the present embodiment produces the following actions and operations.

During an operation of the vehicle air conditioning device 1, external air or internal air taken in from the intake box 4 is fed to the HVAC unit 2 through the blower unit 3, and is circulated to the downstream side in the air flow channel 11. This air flow is cooled by the evaporator 12 while being circulated to the downstream side in the air flow channel 11, and is branched into the bypass flow channel 13 and the heating flow channel 14 in accordance with the opening degree of the air mixing damper 15. The air flow branched into the heating flow channel 14 is heated by the heater core 16, reaches the air mixing region 17 as warm air, and is mixed with cool air from the bypass flow channel 13 in the air mixing region 17, whereby temperature-regulated air having a set temperature is obtained.

In accordance with the blow-off modes such as the face mode, the foot mode, the defroster mode, the defroster/foot mode, and the bi-level mode that can be selectively switched by opening/closing the defroster/face damper 21 and the foot damper 22 for blow-off mode switching, the temperature-regulated air is blown off from any of the defroster blow-off channel 18, the face blow-off channel 19, and the foot blow-off channel 20 into the chamber, to thereby serve for air conditioning in the chamber.

In the vehicle air conditioning device 1, water enters from the external air inlet port 7 of the intake box 4 on a rainy day or during vehicle washing, and the water invades the unit case 10 of the HVAC unit 2 through the blower unit 3. The water is scattered inside of the unit case 10 by wind fed from the blower unit 3. Particularly upstream of the evaporator 12, the water easily leaks to the outside of the unit case 10, that is, to the inside of the chamber from the coupled surface between: the lower divided case 23; and the upper divided case 24 and the upper case 25, and hence such water leakage needs to be prevented from occurring.

In the present embodiment, the lower divided case 23 is coupled to the upper divided case 24 and the upper case 25 through the mating portion 34, whereby water leakage is prevented. In addition, the double-structure barrier is formed for addressing a trouble that water flows beyond the mating portion 34 due to a capillary action as a result of an increase in static pressure in the unit case 10, is pushed out to the outer surface of the unit case 10, and leaks into the chamber, whereby the water can be blocked from leaking into the chamber.

Even if water scattered inside of the unit case 10 flows along an inner surface of the unit case 10 and thus comes near to invading the mating portion 34 from the division end surfaces between: the lower divided case 23; and the upper divided case 24 and the upper case 25 along with an increase in static pressure in the case 10, the water is first blocked by the extended wall surface 37 from invading the space 35, the extended wall surface 37 being extended downward from the division end surface 32 of the left and right upper divided cases 24A and 24B and the upper case 25 and being in contact with the case inner side surface 36 of the lower divided case 23, the space 35 being formed between the case inner division end surfaces 30B and 32, that is, between: the lower divided case 23; and the upper divided case 24 and the upper case 25. Further, even if the water invades the closed space 35 through gaps between the extended wall surface 37 and the case inner side surface 36, the water is blocked by the presence of the space 35 from reaching the mating portion 34.

The space 35 is defined as a space having such a given height in the top-bottom direction and a given width that can prevent a trouble that water that has invaded the space 35 further invades the mating portion 34 due to a capillary action. Hence, it is possible to reliably inhibit a phenomenon that water scattered inside of the unit case directly reaches the root area of the mating portion 34 and the division end surface 32 and invades the mating portion 34 due to a capillary action.

Accordingly, it is possible to reliably prevent a trouble that water that has entered the unit case 10 flows beyond the portion coupled through the mating portion between: the lower divided case 23; and the upper divided case 24 and the upper case 25, due to a capillary action and that the water leaks to the outer surface of the unit case 10, that is, to the inside of the chamber, to thereby enhance the reliability of water leakage prevention.

For specific dimensions of the space 35, it is preferable that the space 35 have a width of approximately 0.5 to 1.5 mm. If the width is less than 0.4 mm, water is more likely to invade the root area of the mating portion 34 due to a capillary action. If the width is more than 1.5 mm, the thickness of the case is large, resulting in a possible decrease in formability. For the height of the space 35, for example, in the case where the extended wall surface 37 is set to 10 mm, it is preferable that the space 35 have a height of approximately 3.0 to 8.0 mm. If the height is less than 3.0 mm, a margin for water held in the space 35 is excessively small, and the water reaches minute gaps in the mating portion 34, so that a capillary action may occur. If the height is more than 8.0 mm, an abutment portion between the lower divided case 23 and the extended wall surface 37 is excessively small, and the case may be unsteady in the left-right direction, so that attachment properties may be decreased. Accordingly, it is desirable that the abutment portion between the extended wall surface 37 and the lower divided case 23 be secured to be at least equal to or more than 2.0 mm.

Water that has invaded the unit case 10 is collected into the drain pan 26 formed below the area in which the evaporator 12 is set, and is discharged to the outside of the chamber through the drain hole 27. Hence, the water is not blown off into the chamber through the defroster blow-off channel 18, the face blow-off channel 19, the foot blow-off channel 20, and the like of the HVAC unit 2.

Further, in the present embodiment, the chamfered or rounded portions 38 and 39 are respectively provided in any one or both of: the corner portion between the inner side surface 36 of the lower divided case 23 and the case inner division end surface 30B thereof; the extended wall surface 37 of the upper divided case 24 and the upper case 25 being in contact with the inner side surface 36; and the corner portion of the leading end surface of the extended wall surface 37, the corner portion being in contact with the inner side surface 36 of the lower divided case 23. Hence, at the time of fitting and integral coupling through the mating portion 34 provided on the division end surfaces of the lower divided case 23, the upper divided case 24, and the upper case 25, the extended wall surface 37 provided in the upper divided case 24 and the upper case 25 can be abutted against the inner side surface 36 of the lower divided case 23 with the chamfered or rounded portions 38 and 39 serving as guide surfaces.

Accordingly, because the leading end surface of the extended wall surface 37 is prevented from abutting against the case inner division end surface 30B of the lower divided case 23, attachment properties between: the lower divided case 23; and the upper divided case 24 and the upper case 25 are not impaired, and the lower and upper divided cases 23, 24, and 25 and the like can smoothly integrally be assembled and coupled to each other.

The present invention is not limited to the invention according to the above-mentioned embodiment, and can be modified as appropriate within a range that does not depart from the gist thereof. For example, in the above-mentioned embodiment, description is given of an example in which the unit case 10 is divided into the lower divided case 23, the left and right upper divided cases 24A and 24B, and the upper case 25, but how to divide the unit case 10 is not limited thereto. For modified examples, the left and right upper divided cases 24A and 24B may be integrated with each other, and the lower divided case 23 may be divided from the fan casing 6.

In the above-mentioned embodiment, description is given of an example in which the blower unit 3 is arranged on one side of the HVAC unit 2, but it goes without saying that the present invention can be similarly applied to a vertical HVAC unit in which the blower unit 3 is arranged in the top-bottom direction on the front side or rear side of the HVAC unit 2.

REFERENCE SIGNS LIST

1 vehicle air conditioning device
2 air conditioning unit (HVAC unit)
3 blower unit
10 unit case
12 evaporator
16 heater core
23 lower divided case
24 upper divided case
24A, 24B left and right upper divided cases
25 upper case
30A case outer division end surface
30B case inner division end surface
31 convex portion
32 division end surface
33 concave portion
34 mating portion
35 space
36 case inner side surface
37 extended wall surface
38, 39 chamfered or rounded portions

The invention claimed is:

1. A vehicle air conditioning device including an air conditioning unit that includes an evaporator and a heater core and regulates temperature of air fed from a blower unit to blow off the air into a chamber and a unit case of the air conditioning unit that is formed of at least two divided cases including an upper divided case and a lower divided case, the two divided cases being coupled integrally to each other through a mating portion provided to division end surfaces of the two divided cases, the vehicle air conditioning device comprising;
- an extended wall surface that is extended from a position of case inner division end surface of one divided case of the two divided cases to a position in contact with an inner side surface of other divided case of the two divided cases; and
- a space that is formed between case inner division end surfaces of the one divided case and the other divided case and that is closed by the extended wall surface, wherein
- the space has a width of approximately 0.5 to 1.5 mm and has a height of approximately 3.0 to 8.0 mm, when the extended wall surface is set to 10 mm long.

2. The vehicle air conditioning device according to claim 1, further comprising a chamfered or rounded portion provided in any one or both of: a corner portion between the inner side surface of the other divided case and the case inner division end surface thereof, the extended wall surface being in contact with the inner side surface; and a corner portion of a leading end surface of the extended wall surface, the corner portion being in contact with the inner side surface of the other divided case.

* * * * *